United States Patent [19]

Breitenbacher et al.

[11] Patent Number: 4,852,863
[45] Date of Patent: Aug. 1, 1989

[54] PNEUMATIC SUSPENSION FOR MOTOR VEHICLES

[75] Inventors: Juergen Breitenbacher, Winterbach; Walter Kuehle, Neckarwestheim; Roland Moennings, Stuttgart; Udo Neumann, Leonberg; Wolfgang Schramm, Stuttgart, all of Fed. Rep. of Germany

[73] Assignee: Robert Bosch GmbH, Stuttgart, Fed. Rep. of Germany

[21] Appl. No.: 207,477

[22] Filed: Jun. 16, 1988

[30] Foreign Application Priority Data

Aug. 22, 1987 [DE] Fed. Rep. of Germany ....... 3728120

[51] Int. Cl.$^4$ .......................... B60G 17/04; F16F 9/50
[52] U.S. Cl. ................................. 267/218; 267/64.19; 280/707
[58] Field of Search ...................... 188/299; 267/64.16, 267/64.17, 64.19, 64.21, 64.23, 64.25, 64.27, 218; 280/707

[56] References Cited

U.S. PATENT DOCUMENTS

| 4,052,088 | 10/1977 | Nicholls | 267/64.16 X |
| 4,386,791 | 6/1983 | Watanabe | 267/DIG. 1 X |
| 4,613,116 | 9/1986 | Buma | 267/64.25 |
| 4,629,170 | 12/1986 | Warmuth | 267/64.25 X |
| 4,655,440 | 4/1987 | Eckert | 267/64.23 X |
| 4,743,000 | 5/1988 | Karnopp | 188/299 X |

FOREIGN PATENT DOCUMENTS

| 1327917 | 4/1963 | France | 188/299 |
| 1564757 | 3/1969 | France | 188/299 |

Primary Examiner—Duane A. Reger
Attorney, Agent, or Firm—Edwin E. Greigg

[57] ABSTRACT

A pneumatic suspension intended for motor vehicles that is equipped with an additional volume. An adjusting piston defining the additional volume separates two work chambers from one another, which can be disconnected from one another or made to communicate with one another via a connecting line and a valve assembly in the connecting line. When the work chambers are in communication, the spring rate of the suspension is variable without force.

6 Claims, 1 Drawing Sheet

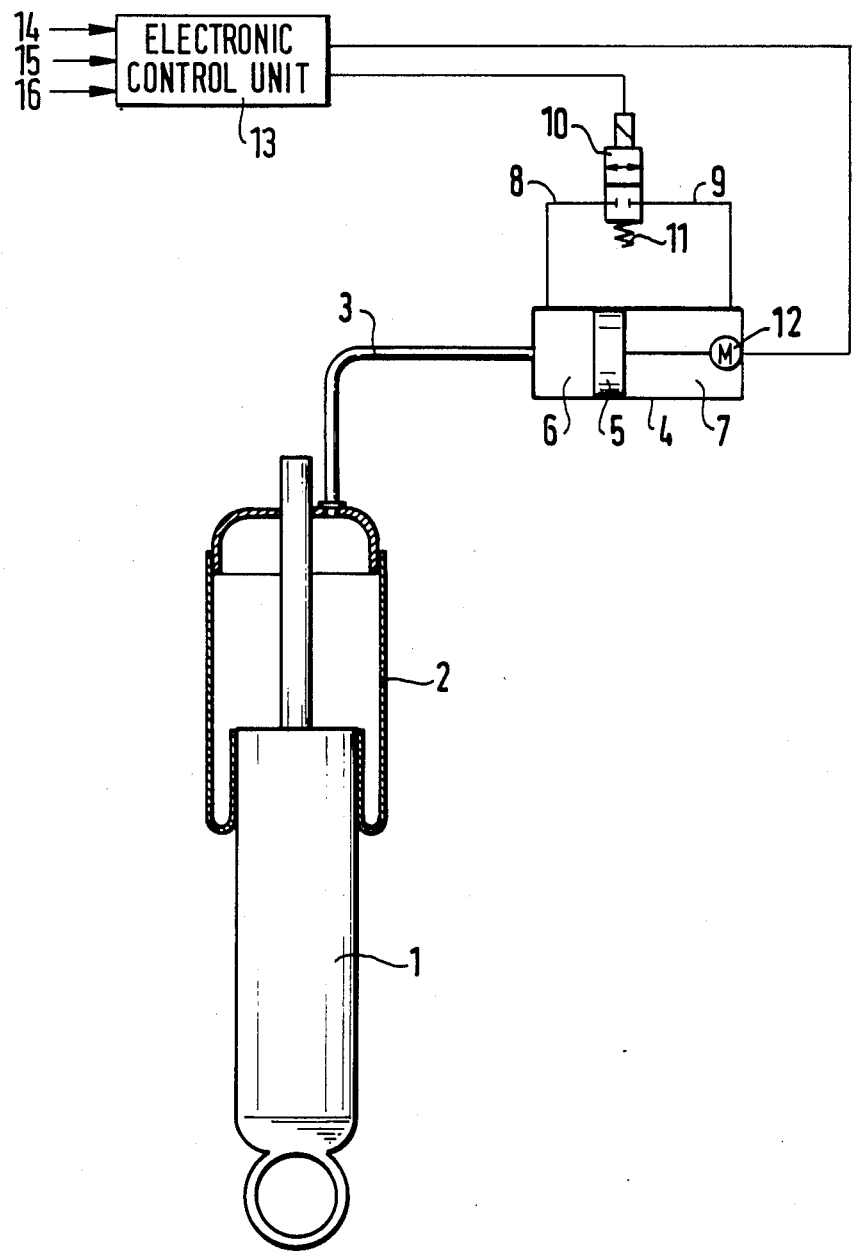

PNEUMATIC SUSPENSION FOR MOTOR VEHICLES

BACKGROUND OF THE INVENTION

The invention is directed to improvements in pneumatic suspension for motor vehicles.

A suspension of this general kind is known from U.S. Pat. No. 2,338,897. In this known design, an adjusting piston with which an additional volume can be varied is adjustable by a pendulum that responds when the vehicle is cornering. Since the adjusting piston separates two work chambers from one another, the first of which forms an additional volume for a spring bellows disposed on the left side of the vehicle, and the second of which forms an additional volume for a spring bellows disposed on the right, this known apparatus is roll damper, which makes the suspension of whichever side of the vehicle is on the outside of the curve stiffer, in that the adjusting piston makes the additional volume smaller on that side.

Such an adjustment is always done under load, which requires that the adjusting linkage exert major forces that leads to rapid wear.

OBJECT AND SUMMARY OF THE INVENTION

It is an object of the invention to provide a novel suspension of the kind described above having the advantage over the prior art that an adjustment is accomplished virtually without force, and is possible under all driving conditions. Finally, it is also advantageous that a spring rate is infinitely adjustable for each individual bellows independently.

The invention will become better appreciated and further objects and advantages thereof will become more apparent from the ensuing detailed description of a preferred embodiment taken in conjunction with the drawing.

BRIEF DESCRIPTION OF THE DRAWING

The single figure illustrate an exemplary embodiment of the invention.

DESCRIPTION OF THE PREFERRED EMBODIMENT

A shock absorber 1, which is intended to be installed between the vehicle axle and the vehicle body, is provided with a spring bellows 2 that concentrically surrounds a piston rod protruding upward from the shock absorber 1. Connected to the spring bellows is an air line 3, which leads to a work cylinder 4.

Located in the work cylinder 4 is an adjusting piston 5, which separates two work chambers 6 and 7 from one another. The adjusting piston 5 is adjusted by an electric motor 12 via a worm gear, not shown, according to driving conditions by a signal from an electronic control unit 13. Outside the work cylinder 4, the two work chambers 6 and 7 communicate with one another via a line 8, 9, into which a valve assembly 10 in the form of a 2/2-way magnetic valve is inserted. A spring 11 assures that the valve assembly 10 is closed in the absence of electric current. The air line 3 communicates only with the work chamber 6 of the work cylinder 4.

A magnet 12 of the valve assembly is connected via lines to an electronic control unit 13, which receives its adjusting commands from altitude sensor 14, load sensor 15 or acceleration sensor 16 on the vehicle.

Mode of Operation

Normally the valve assembly 10 is in its closed position; that is, the two work chambers 6 and 7 are disconnected from one another and the adjusting piston 5 is largely immovable. The additional volume is accordingly invariable, and the spring rate is constant.

However, if changing driving conditions cause the electronic control unit to furnish a current to the valve assembly 10, then the magnet of the magnetic valve is pressed into its other position, in which the two lines 8 and 9 communicate with one another. Then the adjusting piston 5 can be adjusted between the two work chambers 6 and 7 via the electric motor 12 largely without force, and can assume a new position, in which the additional volume in the work chamber 6 is changed; after the closure of the valve assembly, a new spring rate is then set, which is then definitive for the air suspension.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A pneumatic suspension for motor vehicles which includes a shock absorber having a spring bellows disposed between a vehicle axle and a vehicle body, a work cylinder, an adjustable piston in said work cylinder that separates said work cylinder into first and second work chambers, a fluid flow line connected from said shock absorber to one work chamber of said work cylinder, the volume of said one work chamber serving as an additional spring volume for said spring bellows and being variable in volume by means of said adjusting piston, a further fluid flow line that connects said first work chamber with said second work chamber, a control valve assembly disposed in said further fluid flow line to control fluid flow between said first and second work chambers, said one work chamber connected to said spring bellows is variable in volume without pressure when said valve assembly is open, and said second work chamber communicates with said first work chamber only during adjustment of a spring rate in said shock absorber.

2. A suspension as defined by claim 1, in which said valve assembly (10) is a 2/2-way magnetic valve, which assumes a closed position under the force of a spring (11).

3. A suspension as defined by claim 1, which includes an electronic control unit that produces switching commands for said valve assembly (10) in accordance with signals received from an altitude sensor, load sensor and vibration sensor.

4. A suspension as defined by claim 2, which includes an electronic control unit that produces switching commands for said valve assembly (10) in accordance with signals received from an altitude sensor, load sensors and vibration sensor.

5. A suspension as set forth in claim 3, which includes a motor for changing a position of said adjusting piston in said work cylinder.

6. A suspension as set forth in claim 4, which includes a motor for changing a position of said adjusting piston in said work cylinder.

* * * * *